(12) United States Patent
Sha et al.

(10) Patent No.: US 12,256,259 B2
(45) Date of Patent: Mar. 18, 2025

(54) QUALITY-OF-SERVICE AND QUALITY-OF-EXPERIENCE MONITORING

(71) Applicant: ZTE Corporation, Guangdong (CN)

(72) Inventors: Xiubin Sha, Guangdong (CN); Bo Dai, Guangdong (CN); Ting Lu, Guangdong (CN); Dapeng Li, Guangdong (CN); Jie Tan, Guangdong (CN); Li Niu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 369 days.

(21) Appl. No.: 17/848,889

(22) Filed: Jun. 24, 2022

(65) Prior Publication Data

US 2022/0322127 A1    Oct. 6, 2022

Related U.S. Application Data

(63) Continuation of application No. PCT/CN2020/107982, filed on Aug. 7, 2020.

(51) Int. Cl.
H04W 24/10 (2009.01)

(52) U.S. Cl.
CPC .................... *H04W 24/10* (2013.01)

(58) Field of Classification Search
None
See application file for complete search history.

(56) References Cited

U.S. PATENT DOCUMENTS

| | | | | |
|---|---|---|---|---|
| 2020/0127907 A1* | 4/2020 | Koo | ....................... | H04W 24/04 |
| 2020/0228189 A1* | 7/2020 | Tang | ..................... | H04W 36/06 |
| 2021/0037594 A1* | 2/2021 | Dalsgaard | ............. | H04W 76/34 |
| 2021/0409967 A1* | 12/2021 | Franke | .................. | H04W 24/10 |
| 2022/0295442 A1* | 9/2022 | Goyal | ................... | H04W 64/00 |

FOREIGN PATENT DOCUMENTS

| | | |
|---|---|---|
| CN | 110611934 A | 12/2019 |
| CN | 110972188 A | 4/2020 |
| WO | 2020115885 A1 | 11/2020 |

OTHER PUBLICATIONS

Extended European Search Report for European Patent Application No. 20948795.8, mailed Feb. 14, 2022 (16 pages).
Motorola, "Correction to UE Positioning privacy procedures," 3GPP TSG RAN WG2 Meeting #37, Hungary, Budapest, R2-031670, 4 pages, Aug. 25-29, 2003.
International Search Report and Written Opinion for International Application No. PCT/CN2020/107982, mailed Apr. 26, 2021 (7 pages).

(Continued)

*Primary Examiner* — Eunsook Choi
(74) *Attorney, Agent, or Firm* — Perkins Coie LLP

(57) ABSTRACT

Methods, systems, and devices for quality-of-service (QoS) and quality-of-experience (QoE) monitoring in mobile communication technology are described. An example method of wireless communication includes receiving, by a second network element from a first network element, a measurement request message, performing, based on the measurement request message, one or more measurements to generate a measurement report message, and transmitting, to the first network element, the measurement report message.

14 Claims, 17 Drawing Sheets

(56) References Cited

OTHER PUBLICATIONS

Tencent, "Change Request: Support of the TSN Time Drift Threshold," SA WG2 Meeting #135, Split Croatia, S2-190XXXX, 9 pages, Oct. 14-18, 2019.
Partial Supplementary European Search Report for European Patent Application No. 20948795.8, mailed Nov. 14, 2022 (16 pages).
ZTE, "Change Request: clarification on the Qos mapping, TSCAI creation and 5GS Bridge configuration," 3GPP TSG-SA WG2 Meeting #135, S2-1909431, Split, Croatia Oct. 14-18, 2019 (14 pages).
Huawei, "E2E delay measurement for Qos monitoring for URLLC," 3GPP TSG-RAN WG3 #107-e, R3-200484, Feb. 24-Mar. 6, 2020 E-Meeting (10 pages).
Office Action for Japanese Patent Application No. 2022-540382, mailed Jul. 7, 2023, with English summary (8 pages).

\* cited by examiner

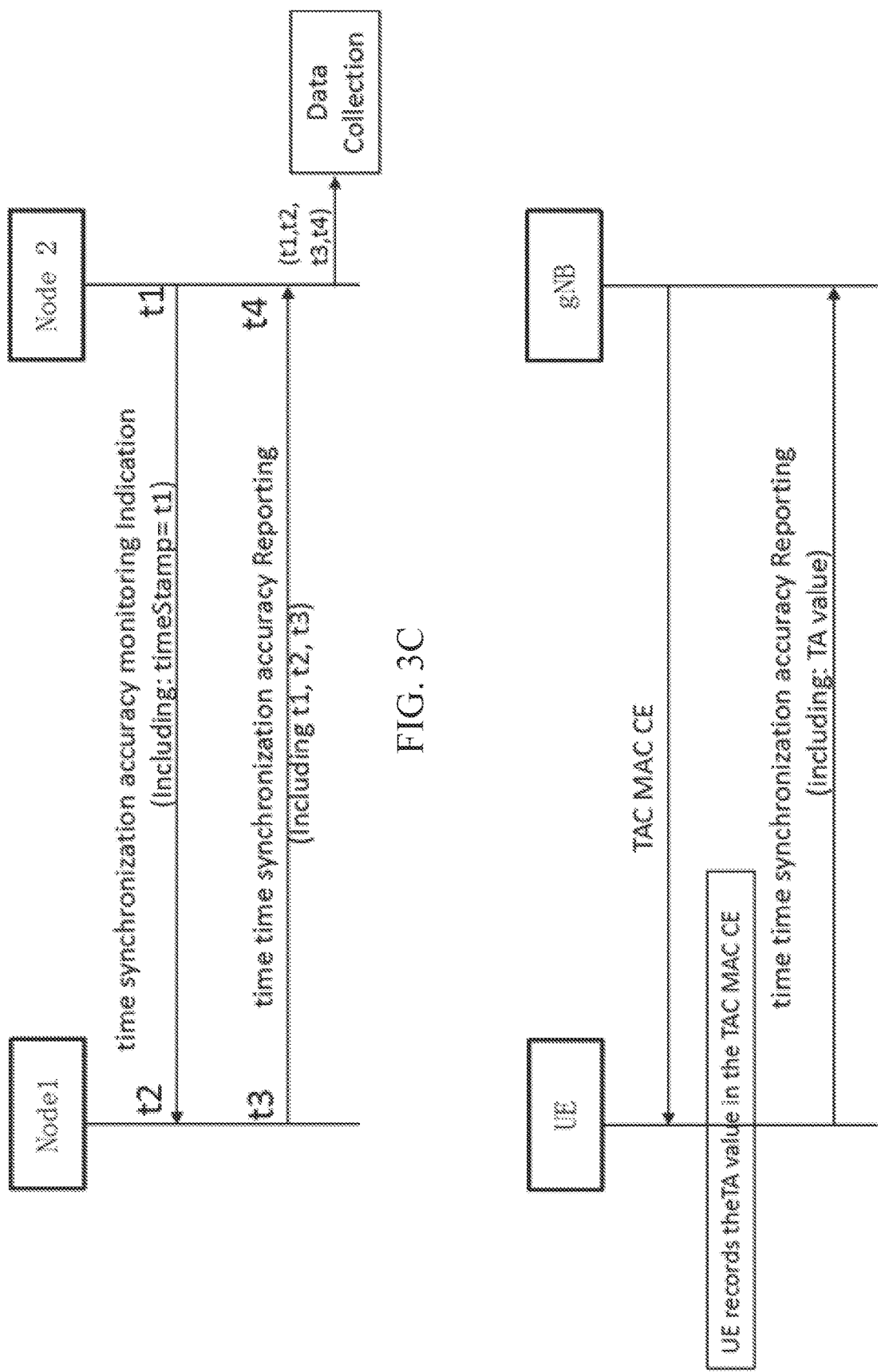

QUALITY-OF-SERVICE AND QUALITY-OF-EXPERIENCE MONITORING

CROSS REFERENCE TO RELATED APPLICATIONS

This patent document is a continuation of and claims benefit of priority to International Patent Application No. PCT/CN2020/107982, filed on Aug. 7, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for quality-of-service (QoS) and quality-of-experience (QoE) monitoring in mobile communication technology, including 5th Generation (5G) and New Radio (NR) communication systems.

In one exemplary aspect, a wireless communication method is disclosed. The method includes transmitting, by a first network element to a second network element, a measurement request message, and receiving, subsequent to the transmitting, a measurement report message.

In another exemplary aspect, a wireless communication method is disclosed. The method includes receiving, by a second network element from a first network element, a measurement request message, performing, based on the measurement request message, one or more measurements to generate a measurement report message, and transmitting, to the first network element, the measurement report message.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 3A-3D show examples of time synchronization accuracy monitoring.

DETAILED DESCRIPTION

Network maintenance and parameter configuration optimization are usually costly and time-intensive, and impact the network quality-of-service (QoS) and quality-of-experience (QoE) metrics. In turn, the network maintenance and parameter configuration optimization depend on the QoS and QoE performance. In an example, once a degradation in the QoS and QoE performance is detected, network optimization and parameter configuration optimization can be performed.

Embodiments of the disclosed technology are directed to automatically detecting the QoS and QoE and performing the subsequent optimizations. Existing implementations for this approach include Self-Organizing Networks (SON), Minimization of Drive Testing (MDT), and data collection for QoE. In the present documents, additional approaches, which include 5GS time synchronization accuracy monitoring, Semi-Persistent Scheduling (SPS)/Configured Grant (CG) burst spread monitoring, Predefined Uplink Resource (PUR) suitability, etc., are described.

Figure 1:
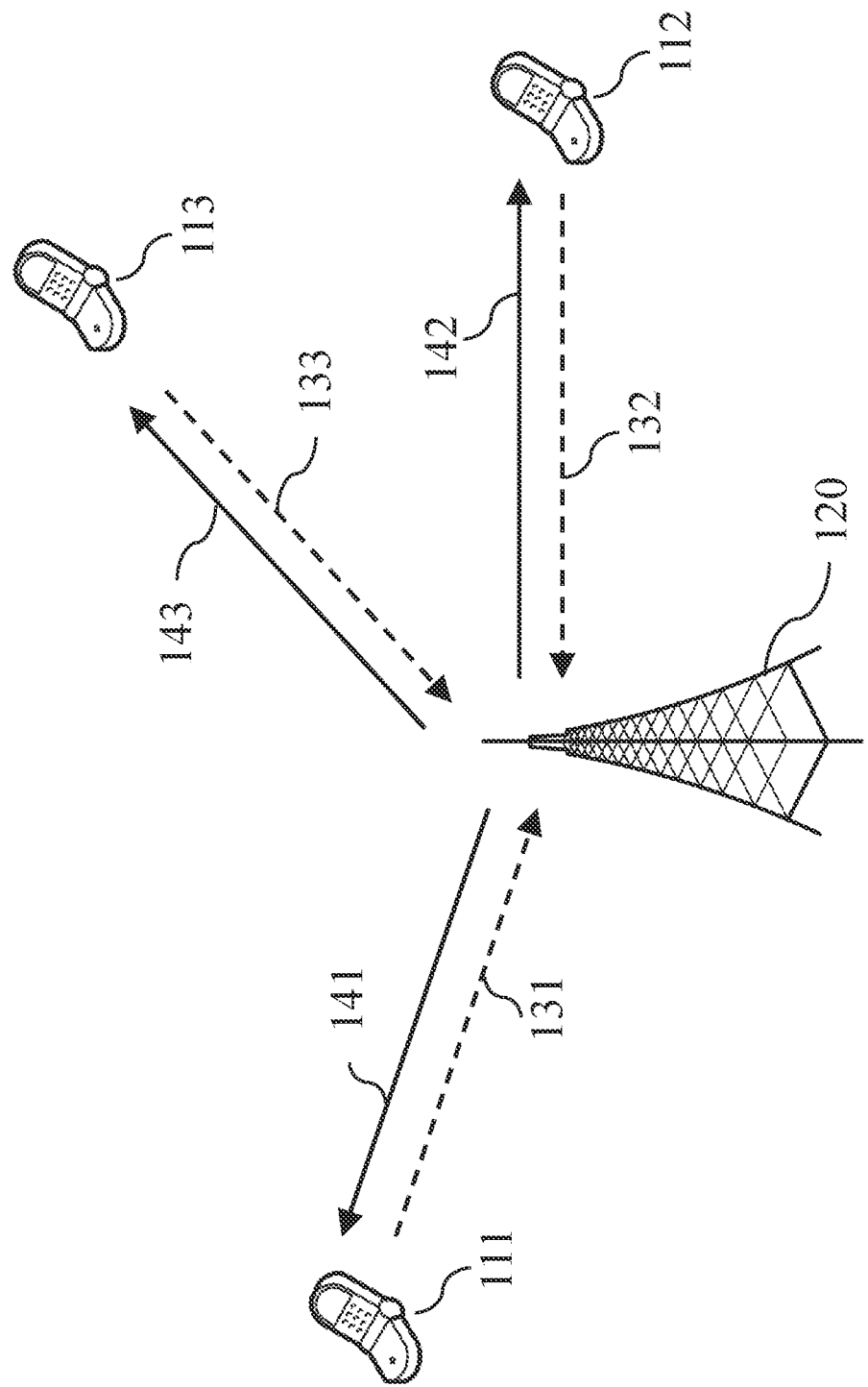
FIG. 1 shows an example of a network node (e.g., base station or gNodeB) and a wireless device (e.g., user equipment (UE)) in wireless communication.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include a measurement request message. In response, the UEs transmit (131, 132, 133) a measurement report to the BS 120. The UE may be, for example, a smartphone, a tablet, a mobile computer, a machine to machine (M2M) device, a terminal, a mobile device, an Internet of Things (IoT) device, and so on.

Figure 2:
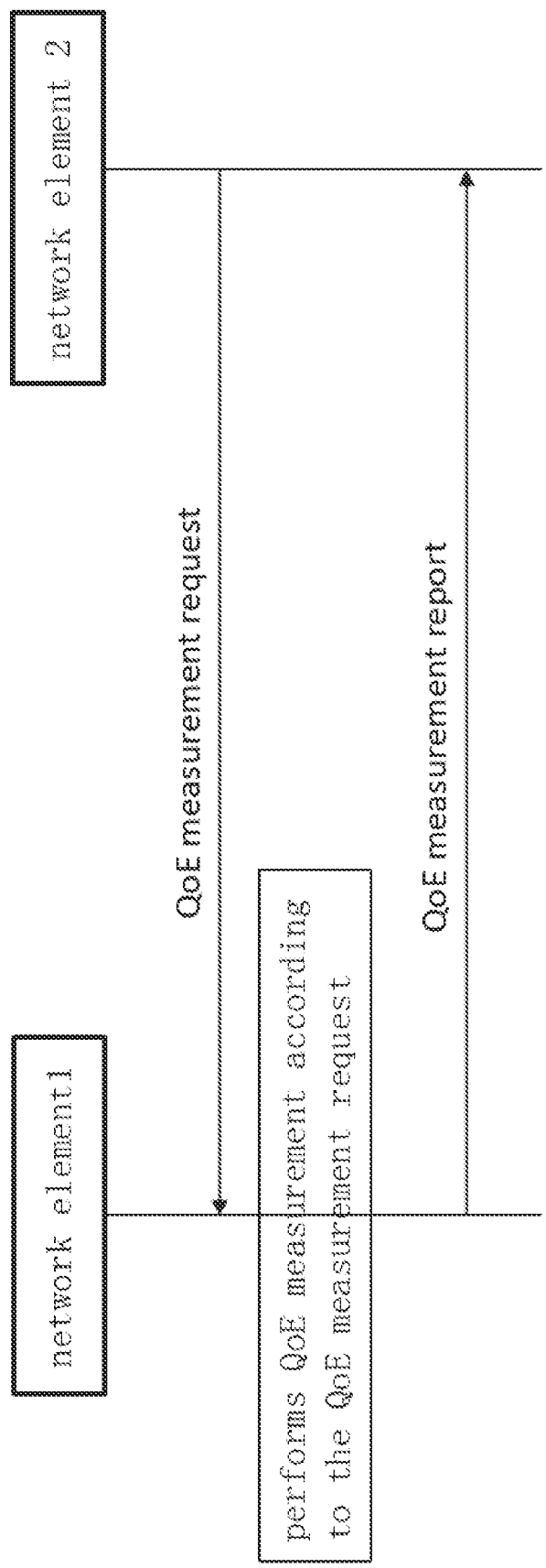
FIG. 2 shows an example of a QoE reporting procedure.

FIG. 2 shows an example of a QoE reporting procedure, which includes the following steps between network element 1 (NE1) and network element 2 (NE2):

Step 1: NE1 receives a QoE measurement request from NE2;

Step 2: NE1 performs measurements according to QoE measurement request; and

Step 3: NE1 reports the measurement result to NE2.

In some embodiments, network element 1 may be a g-NodeB (gNB), a gNB-Centralized Unit (CU), a gNB-Distributed Unit (DU), a User Equipment (UE), or a smart device, and network element 2 may be QoC Collection Entity (QCE), a 5G Core (5GC) network, a gNB, a gNB-CU, or a gNB-DU.

In some embodiments, the measurement request includes one or more of:

1. time synchronization accuracy reporting indication
2. 5GS (TSN bridge) delay reporting indication
3. clock drift reporting indication
4. burst spread reporting indication 5. PUR and/or IDT resource suitability reporting indication 6. survival time reporting indication Herein, the reporting indication can also be one of the following: monitoring indication, measurement indication, or measurement configuration.

In some embodiments, the measurement request can further include a measurement control number (QMC ID) and/or report address information (QCE), and the measurement request can come from one of the following entities: a network management system, various application protocols (e.g., NGAP, S1AP, XNAP, X2AP, F1AP, E1AP), Radio Resource Control (RRC), a System Information Block (SIB), a Medium Access Control (MAC)-Control Element (CE), or Downlink Control Information (DCI).

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Example Embodiments of 5GS Time Synchronization Accuracy Monitoring

Figure 3A:
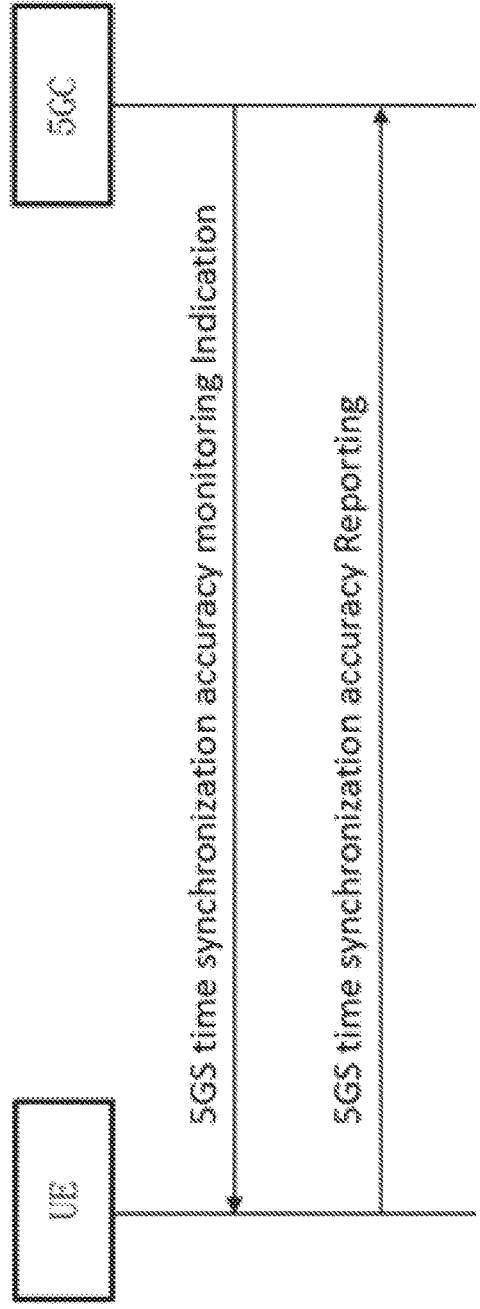

FIG. 3A shows an example of a procedure wherein the 5GC obtains the 5GS time synchronization accuracy. As shown therein, the 5GC sends a 5GS time synchronization accuracy reporting indication to the UE, which can be sent by a Non-Access-Stratum (NAS) Protocol Data Unit (PDU) or a NAS message. In response, the UE sends 5GS time synchronization accuracy report to the UE, which can be sent by NAS PDU or NAS message.

Figure 3B:
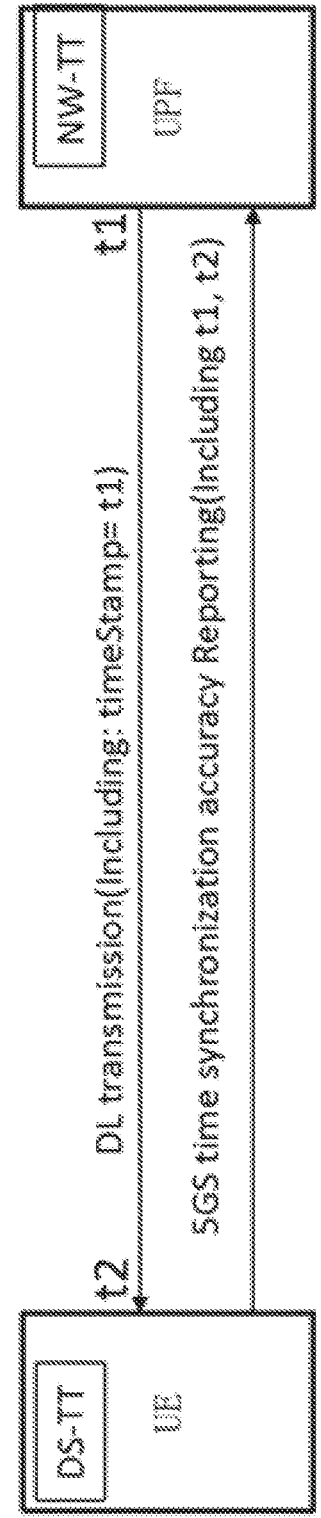

In some embodiments, and as shown in FIG. 3B, the 5GS time synchronization accuracy report includes the transmission timestamp of the downlink (DL) transmission, denoted t1, and a reception timeStamp t2. The DL transmission can be the Time Sensitive Networking (TSN) packet with transmission timeStamp, a DL data transmission with transmission timeStamp or a DL signaling transmission with transmission timeStamp. In an example, for the TSN packet with transmission timeStamp, the timeStamp in a gPTP or 802.1 packet can be used as the timeStamp.

Once 5GC obtains the 5GS time synchronization accuracy report (which includes t1 and t2), it can infer the DL transmission delay (e.g., DL delay=t2−t1), combine it with the UL transmission delay, which can be obtained based on the UL TSN packet timeStamp, and can then determine whether the UE's clock is accurate (e.g., based on whether DL transmission delay equals UL transmission delay).

In some embodiments, the device-side TSN translator (DS-TT) and the UE are combined. In other embodiments, the DS-TT and the UE are separate. In an example, for a UL TSN transmission, a timeStamp will usually be added in the TSN packet by the UE-TT.

In some embodiments, the network-side TSN translator (NW-TT) and User Plane Function (UPF) are combined. In other embodiments, the NW-TT and the UPF are separate. In an example, for a DL TSN transmission, a timeStamp will usually be added in the TSN packet by the NW-TT.

FIG. 3C shows another example of time synchronization accuracy monitoring, which is applicable to the following scenarios:

between gNB-CU and gNB-DU, wherein the gNB-CU (Node2) obtains the F1 time synchronization accuracy from the gNB-DU (Node1);

between UE and gNB-DU, wherein the gNB-DU (Node2) obtains the time synchronization accuracy from the UE (Node1);

between UE and gNB, wherein the gNB (Node2) obtains the time synchronization accuracy from the UE (Node1);

between UE and gNB, wherein the 5GC (Node2) obtains the time synchronization accuracy from the gNB (Node1); and between gNBs, wherein the gNB (Node2) obtains the time synchronization accuracy from another gNB (Node1).

In the aforementioned examples, the time synchronization accuracy reporting indication can be a packet frame, NAS PDU or NAS signaling, in which the transmission timeStamp t1 is included, and the time synchronization accuracy report can be sent by a packet frame, NAS PDU or NAS signaling, in which the DL transmission (e.g., carrying the time synchronization accuracy reporting indication) start timeStamp t1, DL transmission (e.g., carrying time synchronization accuracy reporting indication) reception timeStamp t2, UL transmission (e.g., time synchronization accuracy report) start timeStamp t3 are included.

In some embodiments, once Node2 receives the time synchronization accuracy reporting, which includes t1, t2 and t3, it records the UL transmission (e.g., time synchronization accuracy reporting) reception timeStamp t4 and provides (t1, t2, t3, t4) to the data collection component. In an example, the data collection component can based on the (t1, t2, t3, t4) information to infer the DL transmission delay (e.g., DL delay=t2−t1) and the UL transmission delay (e.g., UL delay=t4−t3). Based on whether the DL transmission delay equals the UL transmission delay, the data collection component can determine whether Node 1's clock is accurate.

In some embodiments, the data collection component can be in Node2 or in a Node2 Operation and Maintenance Center (OMC).

In some embodiments, 5GC sends the 5GS time synchronization accuracy reporting indication to the UE, and can be sent by NAS PDU or NAS message.

FIG. 3D shows an example of a Timing Advance (TA) update procedure monitoring used for time synchronization accuracy. As shown therein, the UE records one or more uplink TA values in a Timing Advance Command (TAC) MAC CE that is sent from the gNB and/or downlink Te values that are calculated by the UE. Herein, the uplink TA indicates a Timing Advance between downlink and uplink, or TA values received in a TA Command from gNB, and the downlink Te indicates the DL timing estimation values in a time duration or DL timing estimation deviation values in a time duration. The UE then reports the one or more TA values and/or Te values to the gNB. In an example, the one or more TA values and/or Te values can be a value list.

Example Embodiments for 5GS Delay Monitoring

Figure 4A:
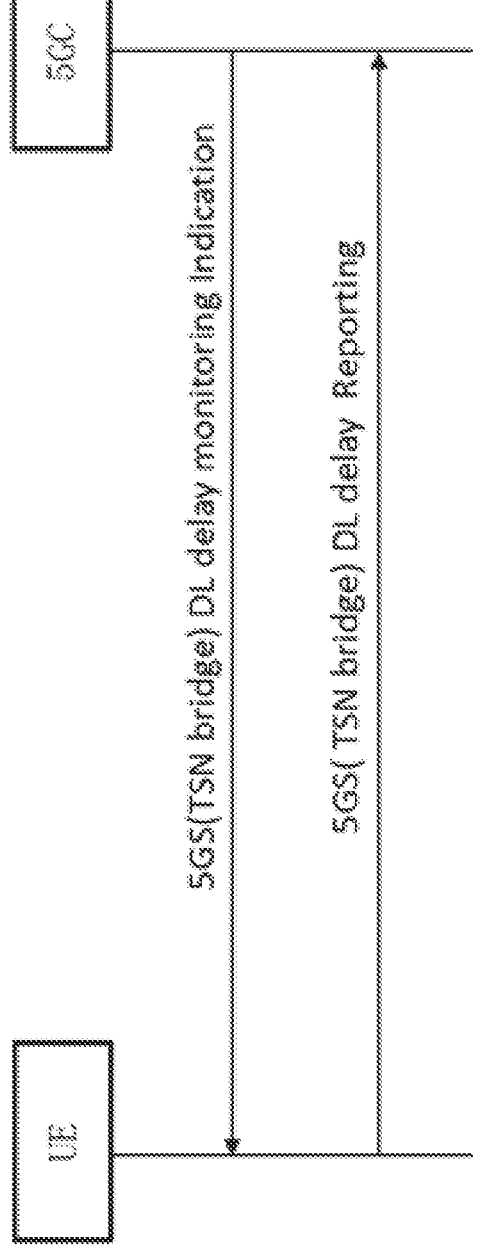
FIGS. 4A-4C show examples of delay monitoring.

FIG. 4A shows an example of 5GS (bridge) delay monitoring. As shown therein, the 5GC transmits a delay reporting indication to the UE (which can be sent by NAS PDU or NAS message), and subsequently receives the 5GS (TSN bridge) delay, which can be sent by NAS PDU or NAS message. This procedure is similar to that shown in FIG. 3A, except the delay in reported in FIG. 4A, whereas the timestamp is reported in FIG. 3A.

Figure 4B:
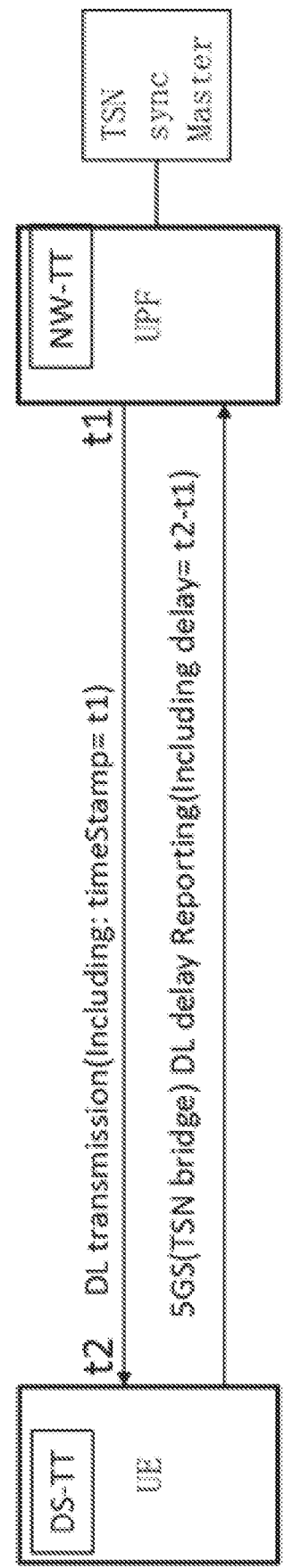

As shown in FIG. 4B, the downlink (DL) transmission can be a TSN packet with transmission timeStamp, a TSN time-domain clock transmission packet, a DL data transmission with transmission timeStamp, or DL signaling transmission with transmission timeStamp. In an example, for the TSN packet with transmission timeStamp, the timeStamp in a gPTP or 802.1 packet can be used as the timeStamp.

Once the UE obtains the DL transmission start timeStamp t1 and the DL transmission reception timeStamp t2, it can infer the 5GS (TSN bridge) transmission delay (e.g., the delay=t2−t1), and report it to 5GC.

In some embodiments, the TSN sync master is located in the network device (e.g., the UPF side), so only a one-way trip delay (DL delay) needs to be reported.

In some embodiments, the device-side TSN translator (DS-TT) and the UE are combined. In other embodiments, the DS-TT and the UE are separate. In an example, for a UL TSN transmission, a timeStamp will usually be added in the TSN packet by the UE-TT.

In some embodiments, the network-side TSN translator (NW-TT) and User Plane Function (UPF) are combined. In other embodiments, the NW-TT and the UPF are separate. In an example, for a DL TSN transmission, a timeStamp will usually be added in the TSN packet by the NW-TT.

Figure 4C:
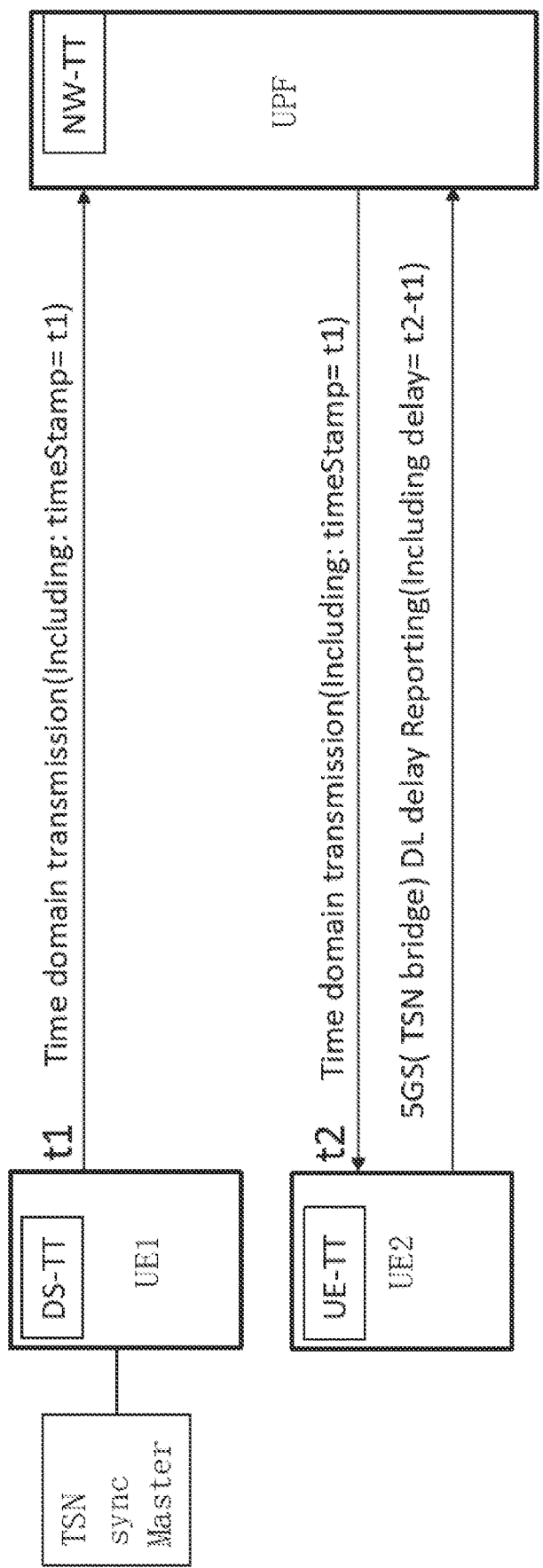

FIG. 4C shows another example of 5GS (bridge) delay monitoring. In this example, the TSN sync master is located at the UE side, so the round-trip delay (UL relay plus DL delay) needs to be reported. As shown in FIG. 4C, the TSN time-domain clock transmission packet is sent from UE1 at timeStamp t1, which is included in the TSN time domain clock transmission packet.

Once UE2 receives the TSN time-domain clock transmission packet with timeStamp t1, the TSN time domain clock transmission packet is augmented with the reception timeStamp t2, and UE 2 can infer the 5GS (TSN bridge) transmission delay (e.g., the delay=t2−t1), and report it to 5GC.

In some embodiments, the device-side TSN translator (DS-TT) and the UE are combined. In other embodiments, the DS-TT and the UE are separate.

In some embodiments, the network-side TSN translator (NW-TT) and User Plane Function (UPF) are combined. In other embodiments, the NW-TT and the UPF are separate.

In some embodiments, for the TSN time-domain clock transmission, a timeStamp will usually be added in the TSN packet by the sender.

Example Embodiments for UE Clock Drift Monitoring

Figure 5A:
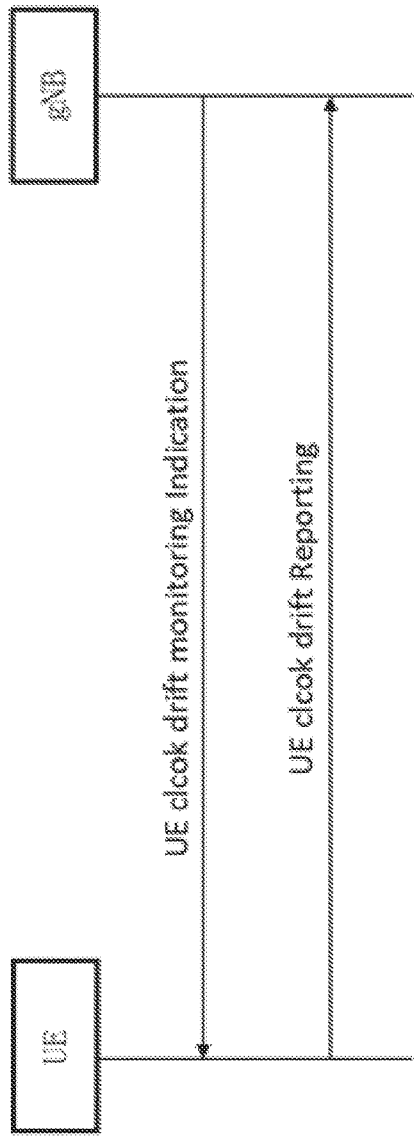
FIGS. 5A-5E show examples of clock drift monitoring.
Figure 5B:
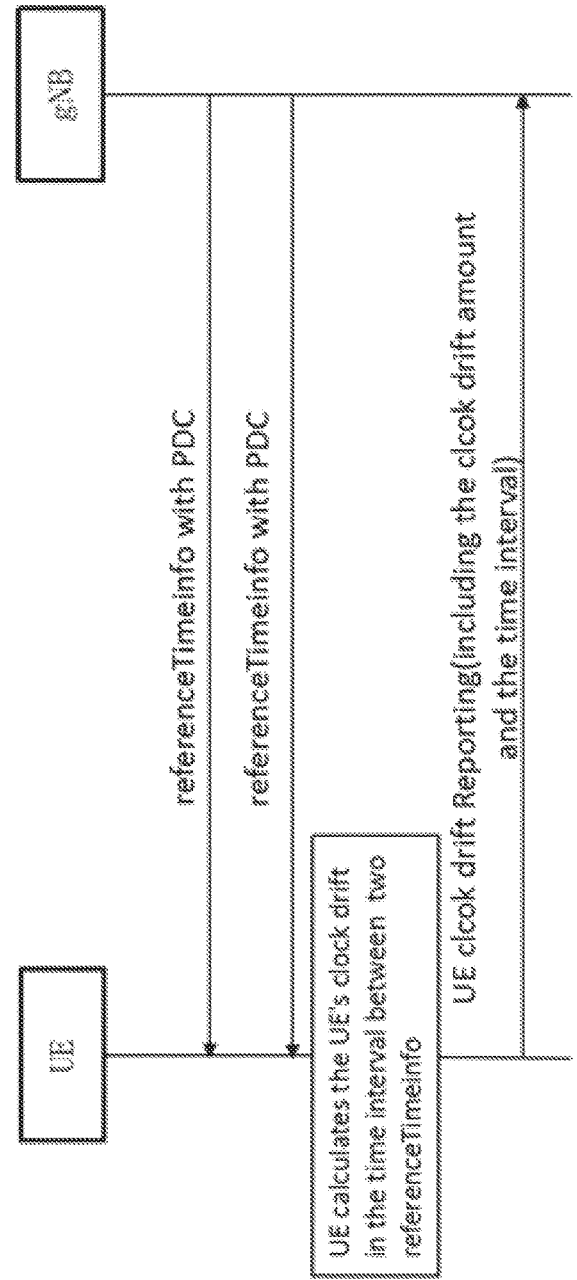
Figure 5C:
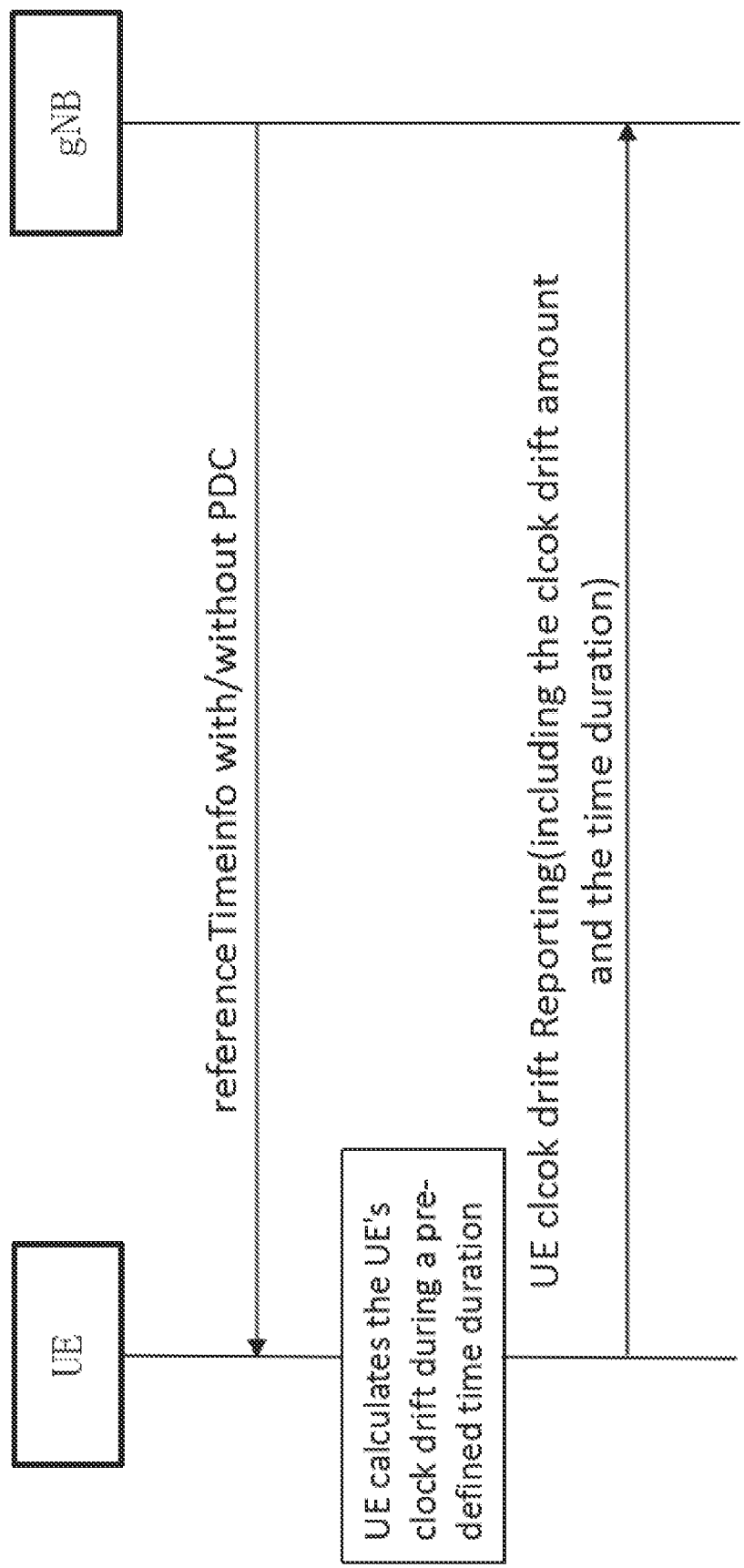

FIG. 5A shows an example procedure to trigger UE clock drift monitoring. As shown therein, the gNB sends a UE clock drift reporting indication to the UE, which can be sent by a System Information Block (SIB), a DL UE specific RRC message, MAC CE, or DCI. Upon reception of the UE clock drift reporting indication, the UE performs the UE clock monitoring (as shown in FIGS. 5B and 5C). After obtaining the clock drift monitoring results, the UE reports it to the gNB, which can be sent by a UL UE specific RRC message or MAC CE.

FIG. 5B shows another example procedure to trigger UE clock drift monitoring. As shown therein, the gNB periodically sends referenceTimeinfo with PDC (Propagation Delay Compensation) to the UE. Upon reception of at least two referenceTimeinfo with PDC, the UE calculates the UE's clock drift in the time interval between the two referenceTimeinfo. In an example, the UE corrects its time clock based on the first referenceTimeinfo. Then, upon receiving the second referenceTimeinfo, it can calculate the time difference between the UE's clock and the current time indicated in the second referenceTimeinfo, thereby determining the UE's clock drift.

In some embodiments, more than two referenceTimeinfo with PDC can be received, in which case the UE can report the clock drift for every two adjacent referenceTimeinfo. In other embodiments, the UE may report the average clock drift, the maximal clock drift, the minimal clock drift, or only one of the clock drift values for every two adjacent referenceTimeinfo.

In FIG. 5C, the gNB sends referenceTimeinfo with or without PDC (Propagation Delay Compensation) to the UE. Upon reception of at least two referenceTimeinfo, the UE corrects the time clock periodically based on the System Frame Number (SFN) and Timing Advance (TA) information. In an example, if the time of the SFN boundary in a first occasion for correcting the clock is X, and the clock correction period is Y number SFN, then the time of the SFN boundary in a second occasion for correcting the clock is $X+10*Y(ms)+N\_TA**T\_c/2$, where $10*Y(ms)$ is the time difference between the two occasions for correcting the clock, and $N\_TA**T\_c/2$ is the PDC or the DL transmission delay. Herein, the time clock correction amount is the time clock drift.

In some embodiments, and similar to the scenario described in FIG. 5B, if more than one clock drift values are obtained, the UE can report the clock drift list, the average clock drift, the maximal clock drift, the minimal clock drift, or only one of the clock drift values for every two adjacent referenceTimeinfo.

Figure 5D:
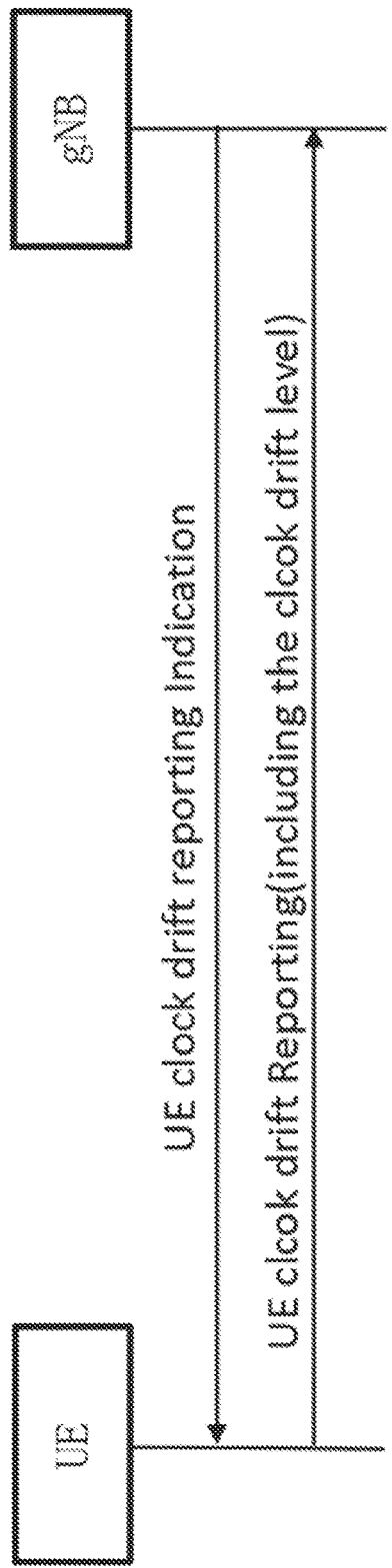

FIG. 5D shows yet another example of UE clock drift level reporting based on a gNB request. As shown therein, the gNB sends a UE clock drift reporting indication to the UE, which can be sent by SIB, DL UE specific RRC message, MAC CE or DCI. If the UE selects a DL UE specific RRC message, MAC CE, or DCI to send the UE clock drift reporting indication, the UE must first send at least one of the following indications to the gNB: UE clock drift reporting capability, TSC service support indication, referenceTimeinfo reception capability, referenceTimeInfo-Preference or an accurate clock synchronization requirement related indication. Finally, the UE sends the UE clock drift reporting to the gNB, which includes the clock drift level, which can be sent by UL UE specific RRC message or MAC CE.

Figure 5E:
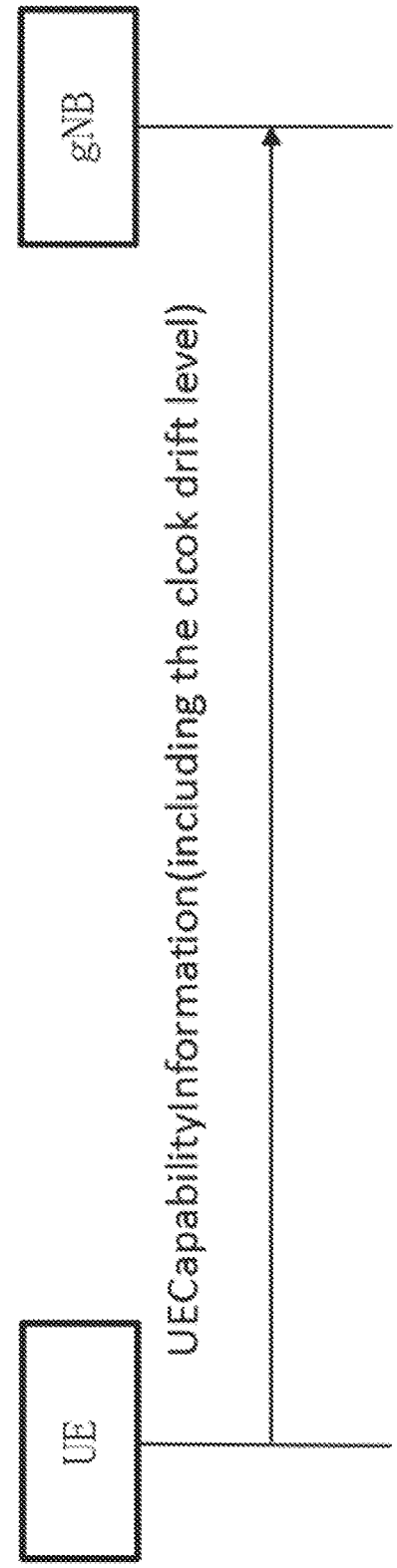

FIG. 5E shows an example of UE clock drift level reporting as a function of UE capability, wherein the UE includes the UE clock drift level in the UECapabilityInformation message, which can be used by eNB when necessary. In an example, the UE clock drift level in FIGS. 3D and 3E can be one of the predefined values shown in Table 1 or Table 2, which correspond to the clock stratum level or the clockAccuracy enumeration, respectively.

TABLE 1

Example of a clock stratum level

| Stratum | Minimum accuracy (ppm) | Minimum stability (ppm) |
|---|---|---|
| 1 | $1 \times 10^{-11}$ | |
| 2 | $1.6 \times 10^{-8}$ | $1 \times 10^{-10}$ |
| 3 | $4.6 \times 10^{-6}$ | $3.7 \times 10^{-7}$ |
| 4 | $3.2 \times 10^{-5}$ | |

TABLE 2

Example of clockAccuracy defined in IEEE Standard 1588

| Value (hex) | Specification |
|---|---|
| 00-1F | Reserved |
| 20 | The time is accurate to within 25 ns |
| 21 | The time is accurate to within 100 ns |
| 22 | The time is accurate to within 250 ns |
| 23 | The time is accurate to within 1 μs |
| 24 | The time is accurate to within 2.5 μs |
| 25 | The time is accurate to within 10 μs |
| 26 | The time is accurate to within 25 μs |
| 27 | The time is accurate to within 100 μs |
| 28 | The time is accurate to within 250 μs |
| 29 | The time is accurate to within 1 ms |
| 2A | The time is accurate to within 2.5 ms |
| 2B | The time is accurate to within 10 ms |
| 2C | The time is accurate to within 25 ms |
| 2D | The time is accurate to within 100 ms |
| 2E | The time is accurate to within 250 ms |
| 2F | The time is accurate to within 1 s |
| 30 | The time is accurate to within 10 s |
| 31 | The time is accurate to >10 s |
| 32-7F | Reserved |
| 80-FD | For use by alternate PTP profiles |
| FE | Unknown |
| FF | Reserved |

In some embodiments, the UE clock drift level defined by 3GPP, e.g, the maximal amount or degree of UE clock drift per predefined time period (e.g., 1 ms or 1 s), can also be used.

Example Embodiments for Burst Spread Monitoring

In a TSN network, 5GC may provide the TSC Assistance Information (TSCAI), which includes burst arrival time and periodicity, to the gNB. The gNB will configure a Configured Grant (CG) and/or a Semi-Persistent Scheduling (SPS) resource based on the TSCAI information. However, data packets may not always arrive at the burst arrival time, e.g., they may arrive before the burst arrival time or after the burst arrival time. This variation in the arrival time is referred to as the burst spread (and is also termed the burst arrival time variation range).

When the packet arrives after the burst arrival time, the packet may not be suitable to be transmitted over the CG or SPS resource. Thus, for parameter optimization, the burst spread should be identified by 5GC (e.g., AMF) that provides the TSCAI or the gNB that provides the SPS and/or CG configuration.

Figure 6A:
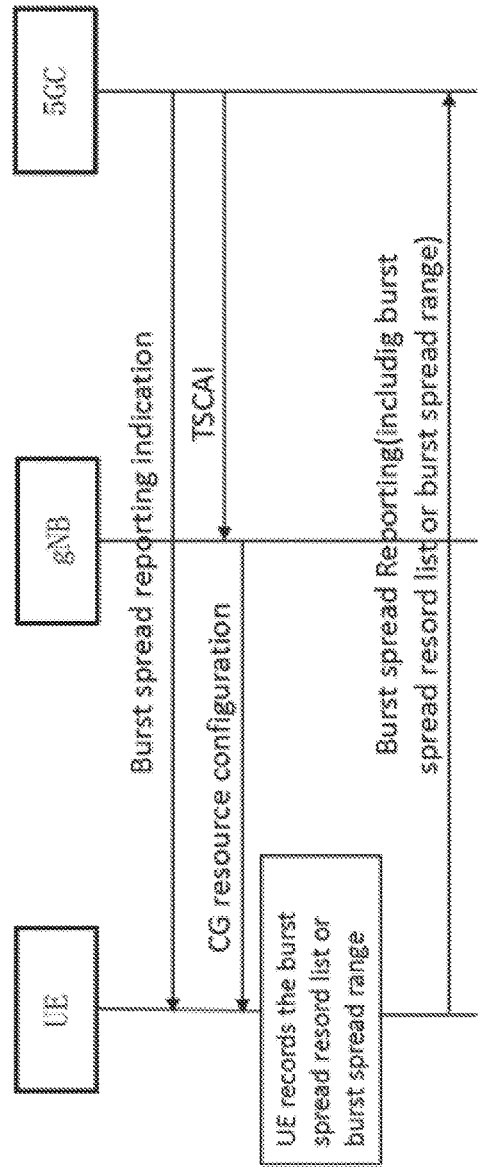
FIGS. 6A-6C show examples of burst spread monitoring.

FIG. 6A shows an example of burst spread monitoring. As shown therein, 5GC sends a burst spread reporting indication to UE, which can be sent by NAS PDU or NAS message. 5GC sends TSCAI to gNB, and gNB configures a CG resource for the UE. The UE records the burst spread information. In an example, the burst spread information that is recorded may include one or more of a burst spread record list per packet, a burst spread range, a maximal burst spread value before the burst arrival value, the minimal burst spread before the burst arrival value (e.g., with a negative value to indicate the maximal burst spread value before the burst arrival value), or the maximal burst spread value after the burst arrival value. Finally, the UE reports the burst spread record to 5GC, which can be sent by NAS PDU or NAS message.

Figure 6B:
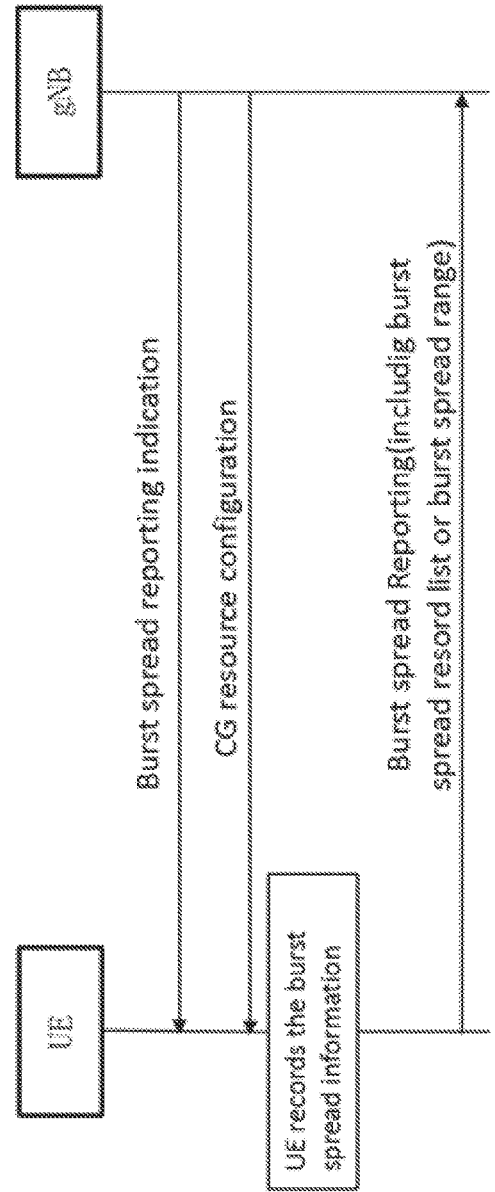

FIG. 6B shows another example of burst spread monitoring. As shown therein, the gNB sends a burst spread reporting indication to UE, which can be sent by SIB, DL UE specific RRC message, MAC CE or DCI. The gNB then configures a CG resource for the UE. The UE records the burst spread information. In an example, the burst spread information that is recorded may include one or more of a burst spread record list per packet, a burst spread range, a maximal burst spread value before the burst arrival value, the minimal burst spread before the burst arrival value (e.g., with a negative value to indicate the maximal burst spread value before the burst arrival value), or the maximal burst spread value after the burst arrival value. Finally, the UE reports the burst spread record to the gNB, which can be sent by UL UE specific RRC message or MAC CE.

Figure 6C:
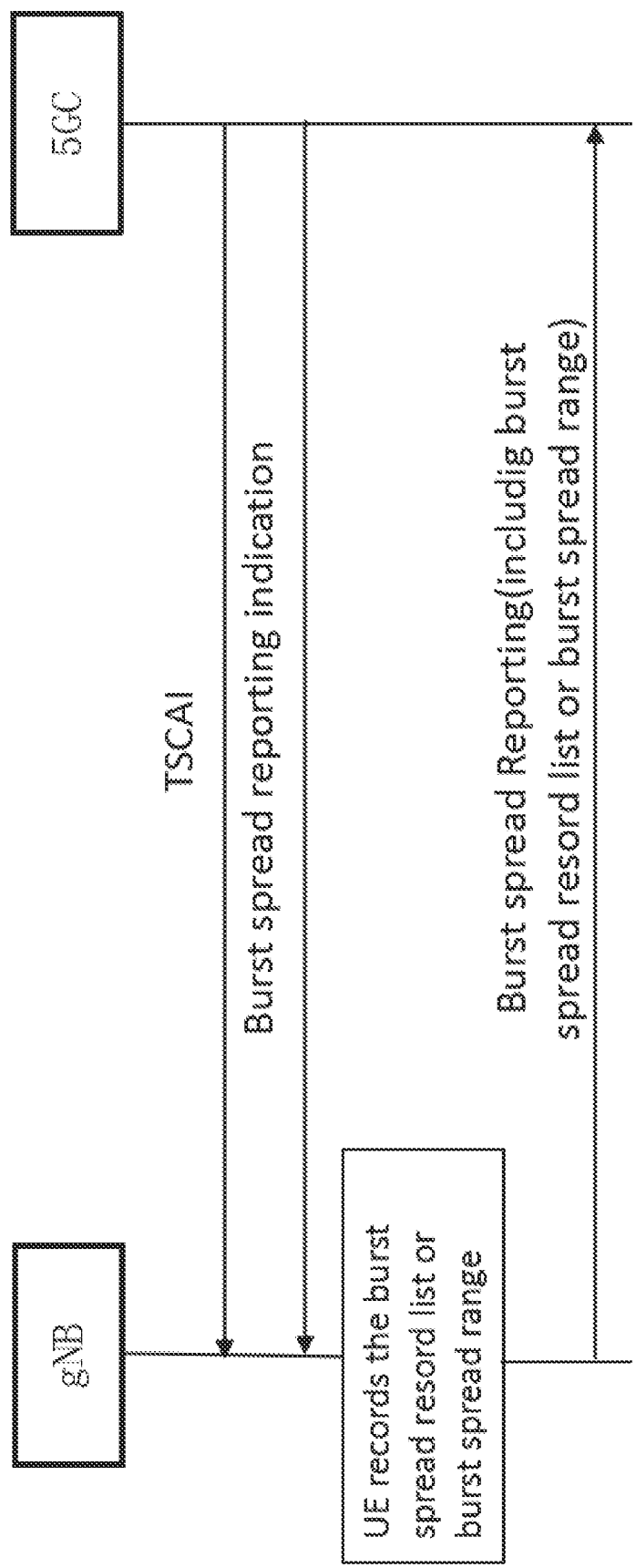

FIG. 6C shows yet another example of burst spread monitoring wherein the 5GC obtains the burst spread from the gNB. As shown therein, 5GC sends TSCAI to gNB which includes DL TSCAI (e.g., TSC Assistance Information Downlink Information Element (IE)). 5GC then sends the burst spread reporting indication to the gNB, which can be sent by NGAP signaling or user data PDU. In some embodiments, the TSCAI and burst spread reporting indication can be sent simultaneously. In other embodiments, and as shown in FIG. 6C, they can be sent in two different operations (e.g., no run-time sequence required). The gNB records the burst spread information. In an example, the burst spread information that is recorded may include one or more of a burst spread record list per packet, a burst spread range, a maximal burst spread value before the burst arrival value, the minimal burst spread before the burst arrival value (e.g., with a negative value to indicate the maximal burst spread value before the burst arrival value), or the maximal burst spread value after the burst arrival value. Finally, the gNB reports the burst spread record to 5GC, which can be sent by NGAP signaling or user data PDU.

Example Embodiments for PUR and/or IDT Resource Suitability Reporting

The Preconfigured Uplink Resource (PUR) is introduced in NB-IoT/eMTC for UE transmission in the idle state (e.g., eNB configures PUR resource in RRCConnectionRelease message, and UE in the idle state can send PUSCH over the configured PUR resource). PUR and/or RRC_INACTIVE Data Transmission (IDT) in NR is used for UE transmissions in RRC_INACTIVE state. In this case, the UL resource will be preconfigured, and UE can perform transmissions over the preconfigured UL resource. If the preconfigured resource is not suitable (e.g., the time domain does not match the data, the data size does not match the TBS, etc.), the PUR and/or IDT resource cannot be used. Furthermore, if the PUR or IDT transmission fails, the PUR and/or IDT resource will be wasted. In order to more efficiently utilize resources, this information should be made aware to the eNB/gNB for PUR and/or IDT resource configuration optimization.

Figure 7:
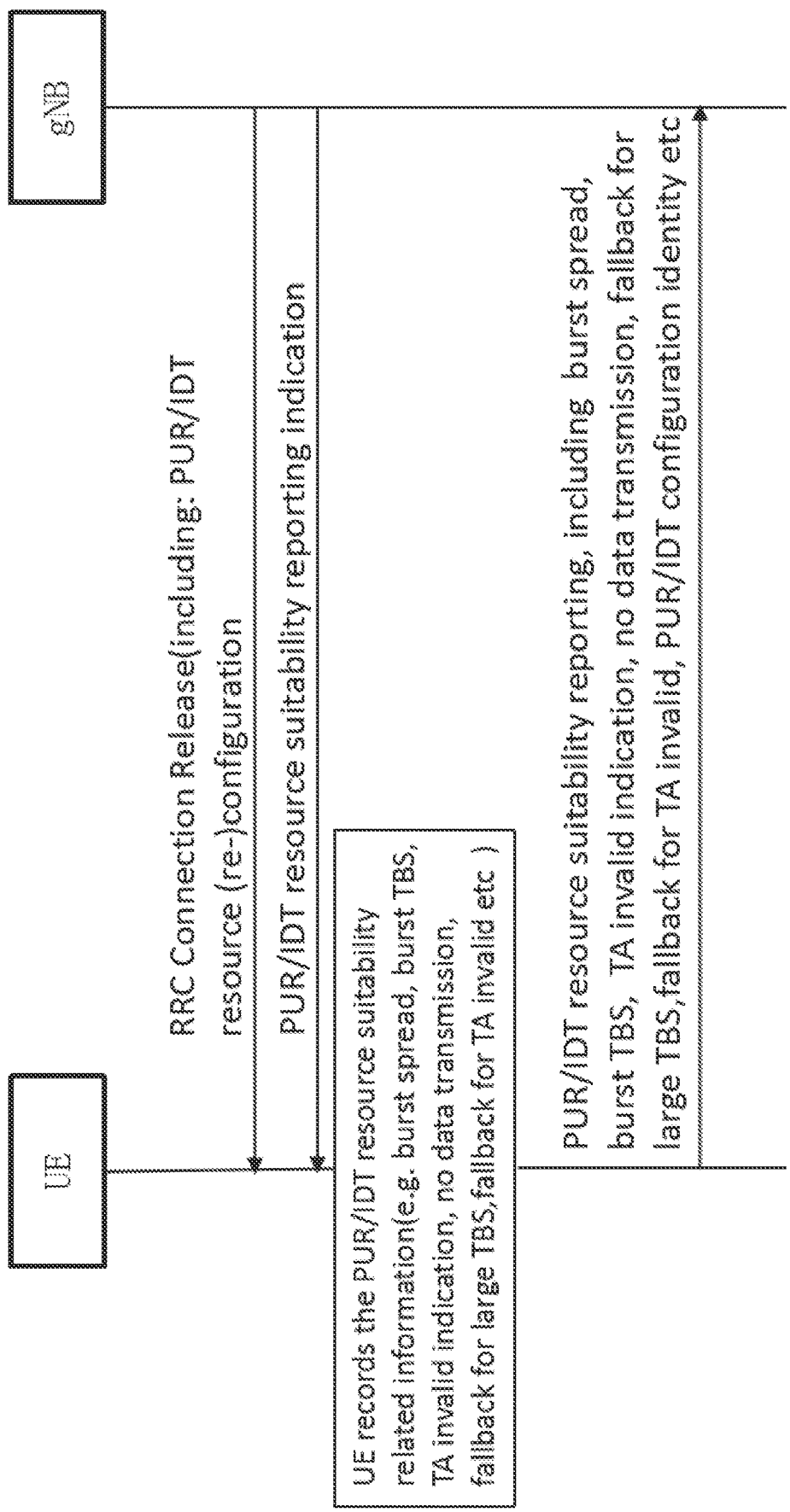
FIG. 7 shows an example of PUR and/or IDT resource suitability reporting.

FIG. 7 shows an example of PUR and/or IDT resource suitability reporting. As shown therein, the gNB (or eNB) sends PUR and/or IDT resource (re-)configuration in RRC Connection Release message, and then sends PUR and/or IDT resource suitability reporting indication, which can be sent by SIB, DL UE specific RRC message, MAC CE or DCI. In an example, the DL UE specific RRC message can be RRC Connection Release message or UE Information Request (e.g., UEInformationRequest) message. In some embodiments, these two operations may be performed simultaneously. In other embodiments, the two operations may be performed separately with no run-time sequence required.

In some embodiments, when the PUR and/or IDT resource suitability reporting indication is sent in DL UE specific RRC message, MAC CE or DCI, the eNB sends the PUR and/or IDT resource suitability report record available indication before the request. The available indication can be sent in UL RRC message in PUR and/or IDT transmission procedure, EDT message 3, RRC message 5, or MAC CE.

In some embodiments, the UE records the PUR and/or IDT resource suitability related information, and then reports the PUR and/or IDT resource suitability related information in the subsequent UL transmission, which can be sent by UL UE specific RRC message or MAC CE. In an example, the UL UE specific RRC message can be UL RRC message in PUR and/or IDT transmission procedure, EDT message 3, RRC message 5, or UE Information Response (e.g., UEInformationResponse) message. In another example, the PUR and/or IDT resource suitability related information includes burst spread information, burst TBS information, TA invalid indication, no data transmission, fallback for large TBS, fallback for TA invalid, PUR and/or IDT configuration identity, etc, which are defined as:

- The burst spread indicates the time variation that PUR and/or IDT burst arrives before or after the PUR and/or IDT resource configured. The burst spread information can include one or more of a burst spread record list per packet, a burst spread range, a maximal burst spread value before the burst arrival value, the minimal burst spread before the burst arrival value (e.g., with a negative value to indicate the maximal burst spread value before the burst arrival value), or the maximal burst spread value after the burst arrival value.
- The burst TBS indicates the TBS of the real burst. The burst TBS information includes one or more of a burst TBS record list per packet, burst TBS range, the maximal burst TBS value, and the minimal burst TBS value.
- TA invalid indication indicates that the TA is invalid at the PUR and/or IDT resource time occasion. In an example, the TA invalid indication can be a single indication, one timestamp of the PUR and/or IDT resource time occasion when the TA is invalid, or a timestamp list of the PUR and/or IDT resource time occasions when the TA is invalid.
- No data transmission indicates that there is no data to be transmitted at the PUR and/or IDT resource time occasion. In an example, it can be one indication, one timestamp of the PUR and/or IDT resource time occasion when there is no data to be transmitted, or a timestamp list of the PUR and/or LDT resource time occasions when there is no data to be transmitted.
- fallback for large TBS indicates that PUR and/or IDT transmission is fallbacked to non-PUR and/or IDT procedure when the TBS is too large to be transmitted on configured the PUR and/or IDT resource. In an example, this can be configured as an indication.
- fallback for TA invalid indicates that PUR and/or IDT transmission is fallbacked to non-PUR and/or IDT procedure for the TA is invalid at the PUR and/or IDT resource time occasion. In an example, this can be configured as an indication.
- PUR and/or LDT configuration identity is used to identify the PUR and/or IDT configuration in eNB/gNB when sending/receiving a PUR and/or IDT resource (re-)configuration and/or PUR and/or IDT resource suitability related information.

Example Embodiments for Survival Time Monitoring

Survival time is defined as the time that an application consuming a communication service may continue without an anticipated message. The maximum survival time indicates the time period the communication service may not meet the application's requirement before the communication service is deemed to be in an unavailable state. The survival time can be expressed as a period or as a maximum number of consecutive incorrectly received or lost messages, especially in the case of cyclical traffic.

In some embodiments, whether the survival time is satisfied or the suitability degree can be monitored in gNB or in UE. Survival time monitoring can be triggered by 5GS to evaluate the 5GS performance, or can be triggered by gNB to evaluate the gNB scheduling performance.

Figure 8A:
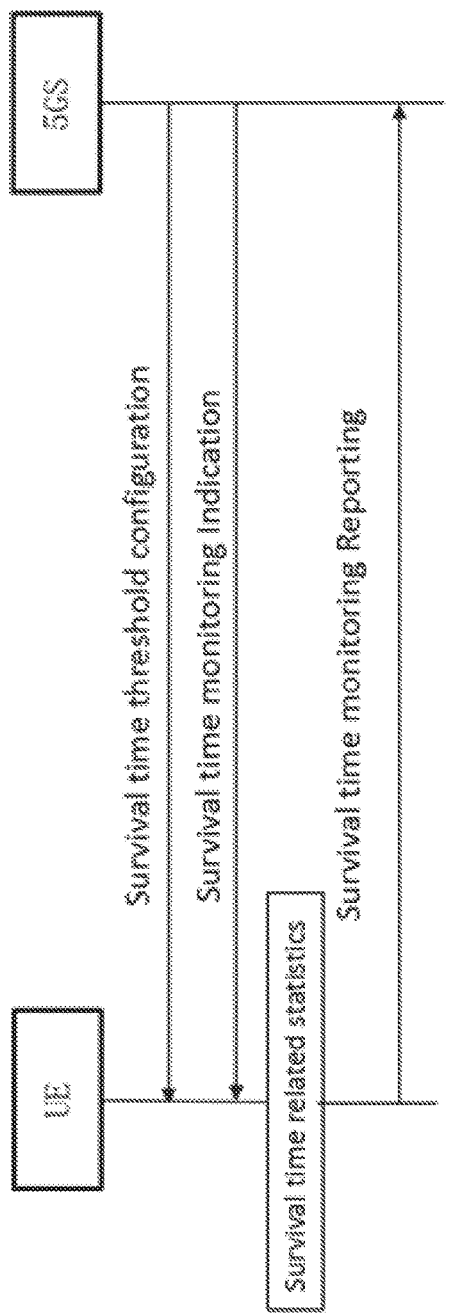
FIGS. 8A-8C show examples of survival time monitoring.

FIG. 8A shows an example of 5GS obtaining survival time monitoring information from the UE. As shown therein, 5GS sends a survival time threshold configuration to UE, which can be sent by NAS PDU or NAS message. 5GS then sends survival time reporting indication to UE, which can be sent by NAS PDU or NAS message. In some embodiments, these two operations may be performed simultaneously (e.g., sent in one NAS PDU or one NAS message). In other embodiments, the two operations may be performed separately with no run-time sequence required. The UE performs measurements and records survival time related statistics, and then sends the survival time monitoring report including the survival time related statistics results to 5GC, which can be sent by NAS PDU or NAS message.

Figure 8B:
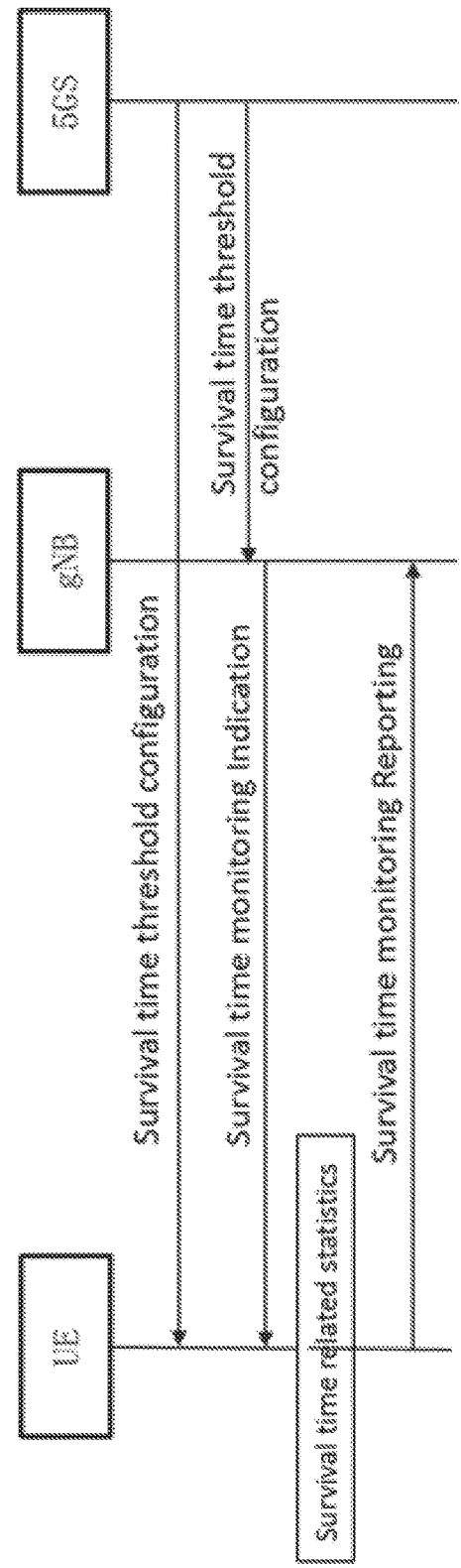

FIG. 8B shows an example of the gNB obtaining survival time monitoring information from the UE. As shown therein, three operations are performed:

- 5GS sends survival time threshold configuration to UE, which can be sent by NAS PDU or NAS message.
- 5GS sends survival time threshold configuration to gNB, which can be sent by NGAP signaling.
- gNB sends survival time reporting indication to UE, which can be sent by SIB, DL UE specific RRC message, MAC CE or DCI.

In some embodiments, these three operations may be performed simultaneously. In other embodiments, the three operations may be performed separately with no run-time sequence required. The UE then performs measurements and gathers the survival time related statistics, and then sends the survival time monitoring report, which includes the survival time related statistics results to gNB, which can be sent by UL UE specific RRC message, MAC CE or DCI.

Figure 8C:
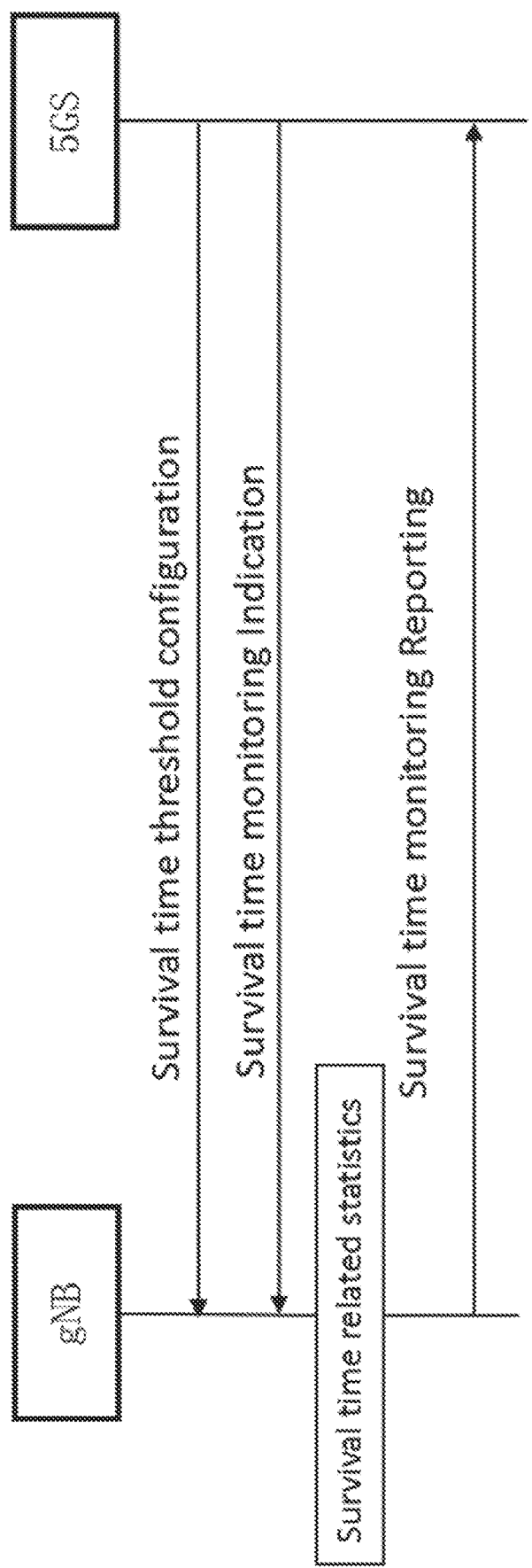

FIG. 8C shows an example of the 5GC obtaining survival time monitoring information from the gNB. As shown therein, two operations are performed:

- 5GS sends Survival time threshold configuration to gNB, which can be sent by NGAP signaling.
- 5GS sends Survival time reporting indication to gNB, which can be sent by NGAP signaling.

In some embodiments, these two operations may be performed simultaneously (e.g., sent in one NGAP signaling). In other embodiments, the two operations may be performed separately with no run-time sequence required. The gNB then performs measurements and gather survival time related statistics, and then sends the survival time monitoring report, which includes the survival time related statistics results to 5GC, which can be sent by NGAP signaling.

In some embodiments, and for FIGS. 8A, 8B and 8C, the survival time related statistics and survival time monitoring report includes at least one of the following: the perception of survival time not satisfied, the number of packets for which the survival time is not satisfied. Herein, the survival time not being satisfied corresponds to the number of consecutive incorrectly received packets reaching a certain threshold or the time duration of consecutive incorrectly received packets reaching a time period threshold.

Example Methods and Implementations for the Disclosed Technology

Figure 9A:
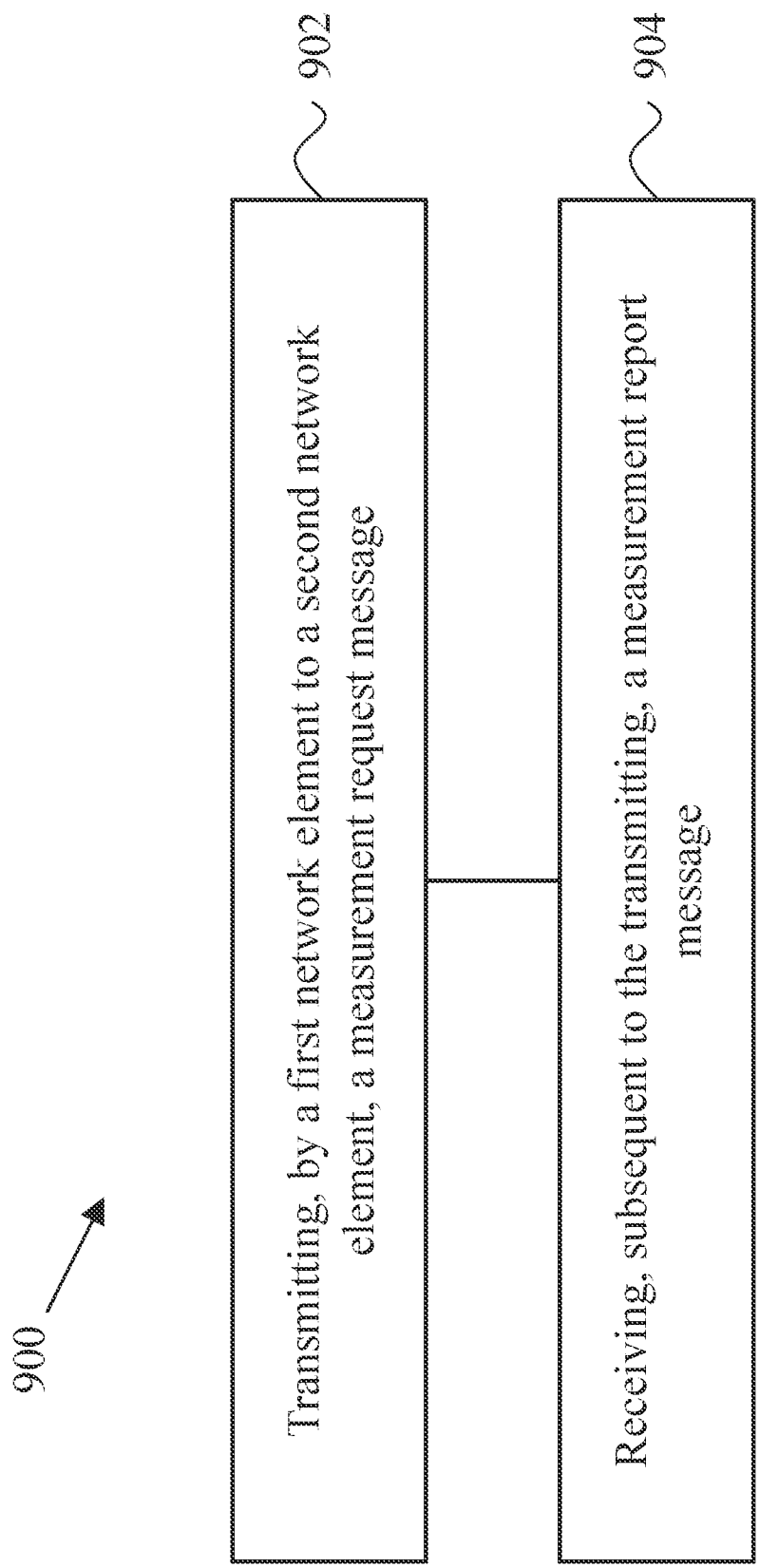
FIGS. 9A and 9B show examples of wireless communication methods.

FIG. 9A shows an example of a wireless communication method 900. The method 900 includes, at operation 902, transmitting, by a first network element to a second network element, a measurement request message.

The method 900 includes, at operation 904, receiving, subsequent to the transmitting, a measurement report message.

Figure 9B:
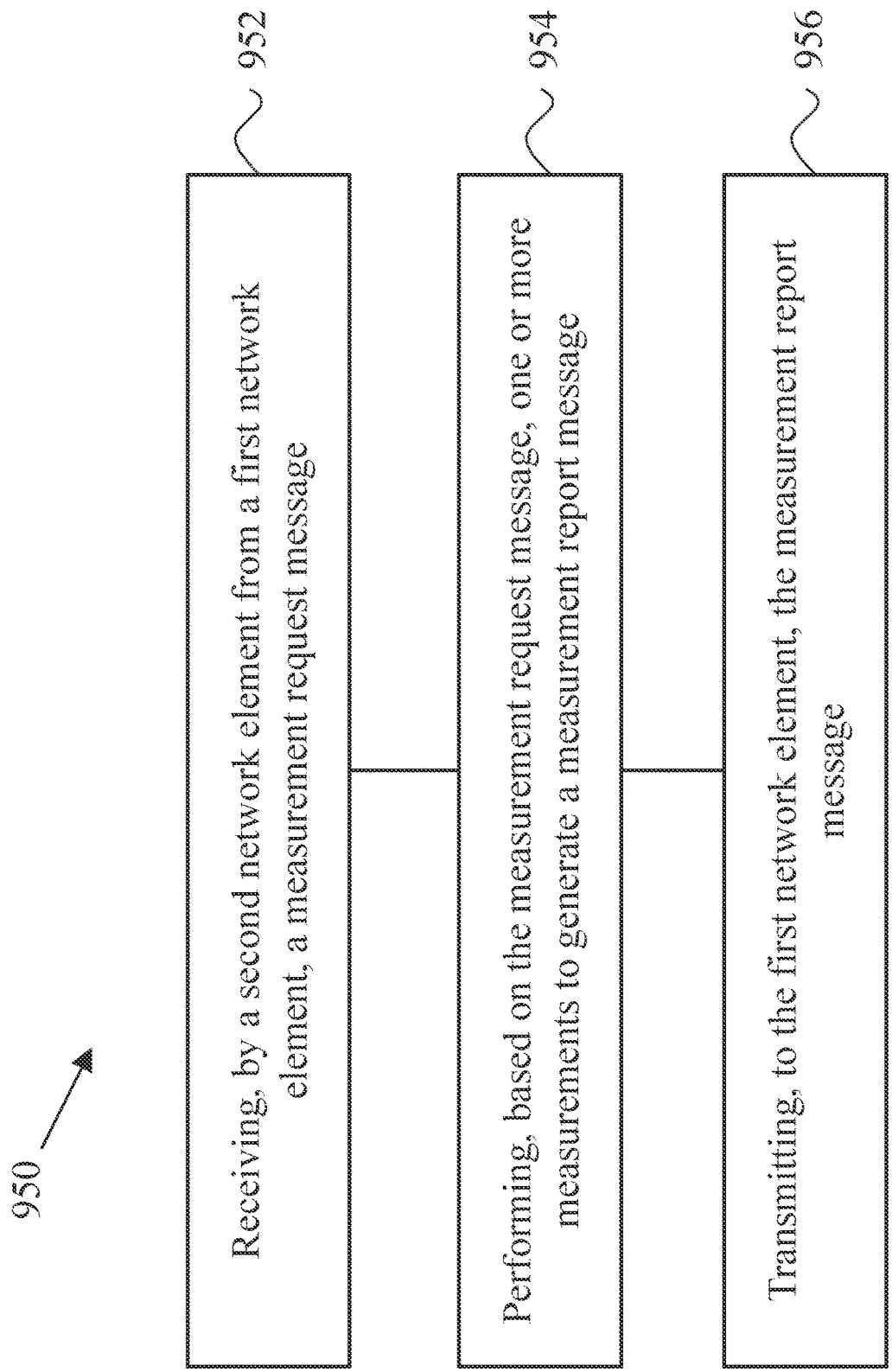

FIG. 9B shows an example of a wireless communication method 950. The method 950 includes, at operation 952, receiving, by a second network element from a first network element, a measurement request message.

The method 950 includes, at operation 954, performing, based on the measurement request message, one or more measurements to generate a measurement report message.

The method 950 includes, at operation 956, transmitting, to the first network element, the measurement report message.

In some embodiments, the first network element is a Quality-of-Experience Collection Entity (QCE), a 5G Core (5GC) network, an eNodeB (eNB), a gNodeB (gNB), or a gNB-Centralized Unit (CU), and wherein the second network element is a user equipment (UE), a gNB, a gNB-Distributed Unit (DU), or a smart device.

In some embodiments, the first network element is the 5GC network and the second network element is the gNB or the UE, the measurement request message is a Non-Access-Stratum (NAS) Protocol Data Unit (PDU) or a NAS message, and the measurement report message is a NAS PDU or a NAS message.

In some embodiments, the first network element is the gNB-CU and the second network element is the gNB-DU, wherein the measurement request message is a F1 Application Protocol (F1AP) or an F1AP Protocol Data Unit (PDU), and the measurement report message is a F1AP or an F1AP PDU.

In some embodiments, the first network element is the eNB and the second network element is the UE, the measurement request message is a Radio Resource Control (RRC) message, a Medium Access Control (MAC) Control Element (CE), or a Radio Frame, and the measurement report message is an RRC message, a MAC CE, or an RF.

In some embodiments, the measurement request message comprises a 5G System synchronization accuracy reporting indication and the measurement report message comprises a 5G System synchronization accuracy report.

In some embodiments, the measurement report message further comprises the first timestamp corresponding to a downlink transmission by the first network element and a second timestamp corresponding to a reception of the downlink transmission by the second network element.

In some embodiments, the downlink transmission comprises the measurement request message or a downlink packet.

In some embodiments, the measurement report message further comprises the first timestamp corresponding to the downlink transmission by the first network element, a second timestamp corresponding to a reception of the downlink transmission by the second network element, and a third timestamp corresponding to a transmission of the measurement report message by the second network element.

In some embodiments, the measurement request message comprises an uplink timing advance (TA) value reporting indication and/or a downlink Te value reporting indication, and the measurement report message comprises the uplink TA values and/or a downlink Te values.

In some embodiments, the measurement request message comprises a 5G System downlink delay reporting indication and the measurement report message comprises a 5G System downlink delay report.

In some embodiments, the measurement request message is a Time Sensitive Networking (TSN) packet and further comprises a first timestamp corresponding to a transmission of the measurement request message, and the measurement report message further comprises a delay that is a difference of the first timestamp corresponding to the transmission of the measurement request message by the first network element and a second timestamp corresponding to a reception of the measurement request message by the second network element.

In some embodiments, the measurement request message comprises a clock drift reporting indication and the measurement report message comprises a clock drift report.

In some embodiments, the first network element is configured to transmit two or more reference time information messages comprising a propagation delay compensation (PDC) parameter, the second network element is configured to determine a clock drift based on a local clock and adjacent reference time information messages of the two or more reference time information messages.

In some embodiments, the clock drift report comprises the clock drift, a maximum value of the clock drift, a minimum value of the clock drift, or an average value of the clock drift.

In some embodiments, the first network element is configured to transmit a reference time information message, the second network element is configured to determine a clock drift based on a predefined time duration and the reference time information message, and the clock drift report comprises the clock drift.

In some embodiments, the predefined time duration is based on a time of a system frame number (SFN) boundary.

In some embodiments, the measurement report message further comprises a clock drift level, and wherein the clock drift level corresponds to one of a plurality of clock stratum levels.

In some embodiments, the measurement report message further comprises an index corresponding to a clock accuracy.

In some embodiments, the measurement request message is a system information block (SIB), a downlink UE-specific radio resource control (RRC) message, a medium access control (MAC) control element (CE) or a downlink control information (DCI), and the measurement report message is an uplink UE-specific RRC message or the MAC CE.

In some embodiments, the measurement request message comprises a burst spread reporting indication and the measurement report message comprises a burst spread report.

In some embodiments, the burst spread report comprises one or more of a burst spread record list per packet, a burst spread range, a maximum burst spread value before a burst arrival value, a minimum burst spread value before the burst arrival value, a maximum burst spread value after the burst arrival value, and a minimum burst spread value after the burst arrival value.

In some embodiments, the measurement request message is a Non-Access-Stratum (NAS) Protocol Data Unit (PDU) or a NAS message, and the measurement report message is a NAS PDU or a NAS message.

In some embodiments, the measurement request message is a system information block (SIB), a downlink UE-specific radio resource control (RRC) message, a medium access control (MAC) control element (CE) or a downlink control information (DCI), and the measurement report message is an uplink UE-specific RRC message or the MAC CE.

In some embodiments, the measurement request message is a next generation application protocol (NGAP) message or a user data protocol data unit (PDU), and the measurement report message is an NGAP message or a user data PDU.

In some embodiments, the measurement request message comprises a Preconfigured Uplink Resource (PUR) or RRC_INACTIVE Data Transmission (IDT) resource suitability reporting indication.

In some embodiments, the measurement report message comprises a PUR or IDT resource suitability information report comprising at least one of a PUR or IDT burst spread, a burst transport block size (TBS), a Timing Advance (TA) invalid indication, an indication of no data transmission on the PUR or IDT resource, an indication of fallback for large TBS, an indication of fallback for TA invalid, and a PUR or IDT configuration identity.

In some embodiments, the first network element is an eNodeB (eNB) or a gNodeB (gNB), and wherein the second network element is a User Equipment (UE).

In some embodiments, the method 900 further comprises the operation of transmitting, by the first network element to the second network element, a measurement threshold configuration message.

In some embodiments, the method 950 further comprises the operation of receiving, by the second network element from the first network element, a measurement threshold configuration message.

In some embodiments, the measurement request message comprises a survival time reporting indication and the measurement report message comprises a survival time monitoring report.

In some embodiments, the survival time monitoring report comprises one or more of a perception of a survival time not being satisfied, a number of packets for which the survival time is not satisfied in a duration, a number of events for which the survival time is not satisfied in a duration, a number of packets that was consecutive incorrectly received in a duration, and wherein the survival time corresponds to a number of consecutive incorrectly received packets exceeding a first threshold or a time duration of the consecutive incorrectly received packets exceeding a second threshold.

In some embodiments, the measurement request message comprises a Time Sensitive Networking (TSN) Quality-of-Experience (QoE) related reporting indication, and wherein the measurement report comprises any available TSN QoE related information comprising at least one of a 5G System synchronization accuracy report, a 5G System downlink delay report, a clock drift report, a burst spread report, a PUR or IDT resource suitability report, and a survival time monitoring report.

In some embodiments, the measurement request message is a Non-Access-Stratum (NAS) Protocol Data Unit (PDU) or a NAS message, wherein the measurement report message is a NAS PDU or a NAS message.

In some embodiments, the measurement request message is a system information block (SIB), a downlink UE-specific radio resource control (RRC) message, a medium access control (MAC) control element (CE) or a downlink control information (DCI), and wherein the measurement report message is an uplink UE-specific RRC message or the MAC CE.

In some embodiments, the measurement threshold configuration message is a Non-Access-Stratum (NAS) Protocol Data Unit (PDU) or a NAS message.

Figure 10:
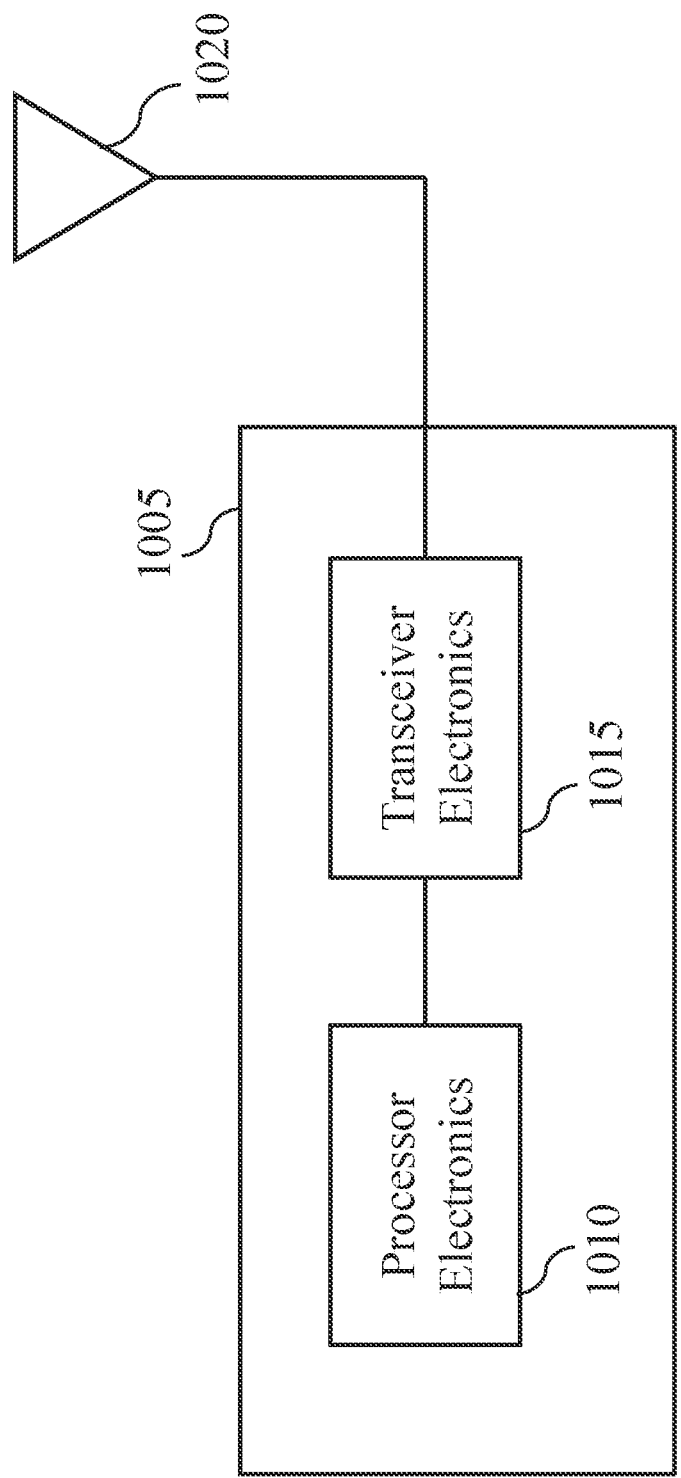
FIG. 10 is a block diagram representation of a portion of an apparatus that can be used to implement methods and techniques described in this document.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
   transmitting, by a first network element to a second network element, a measurement request message; and
   receiving, subsequent to the transmitting, a measurement report message,
   wherein the measurement request message comprises a Time Sensitive Networking (TSN) Quality-of-Experience (QoE) related reporting indication, wherein the measurement report message comprises any available TSN QoE related information comprising at least one of: a 5G System synchronization accuracy report, a 5G System downlink delay report, a clock drift report, a burst spread report, a preconfigured uplink resource (PUR) or inactive data transmission (IDT) resource suitability report, or a survival time monitoring report,
   wherein the first network element is a 5G Core (5GC) network element wherein the second network element is a user equipment (UE) or a gNB,
   wherein the measurement request message is a Non-Access-Stratum (NAS) Protocol Data Unit (PDU) or a NAS message and comprises a 5G System synchronization accuracy reporting indication, and
   wherein the measurement report message is a NAS PDU or a NAS message and comprises a 5G System synchronization accuracy report, a first timestamp corresponding to a downlink transmission by the first network element, and a second timestamp corresponding to a reception of the downlink transmission by the second network element.

2. The method of claim 1, wherein the measurement request message comprises a 5G System downlink delay reporting indication and the measurement report message comprises a 5G System downlink delay report,
   wherein the measurement request message is a Time Sensitive Networking (TSN) packet and further comprises a first timestamp corresponding to a transmission of the measurement request message, and wherein the measurement report message further comprises a delay that is a difference of the first timestamp corresponding to the transmission of the measurement request message by the first network element and a second timestamp corresponding to a reception of the measurement request message by the second network element.

3. The method of claim 1, wherein the measurement request message comprises a clock drift reporting indication and the measurement report message comprises the clock drift report, wherein:
   (1) the first network element is configured to transmit two or more reference time information messages comprising a propagation delay compensation (PDC) parameter, wherein the second network element is configured to determine a clock drift based on a local clock and adjacent reference time information messages of the two or more reference time information messages; or
   (2) the first network element is configured to transmit a reference time information message, wherein the second network element is configured to determine a clock drift based on a predefined time duration and the reference time information message, and wherein the clock drift report comprises the clock drift.

4. The method of claim 1, wherein the measurement request message comprises a burst spread reporting indication and the measurement report message comprises the burst spread report,
   wherein the burst spread report comprises one or more of a burst spread record list per packet, a burst spread range, a maximum burst spread value before a burst arrival value, a minimum burst spread value before the burst arrival value, a maximum burst spread value after the burst arrival value, and a minimum burst spread value after the burst arrival value.

5. A method of wireless communication, comprising:
   receiving, by a second network element from a first network element, a measurement request message;
   performing, based on the measurement request message, one or more measurements to generate a measurement report message; and
   transmitting, to the first network element, the measurement report message,
   wherein the measurement request message comprises a Time Sensitive Networking (TSN) Quality-of-Experience (QoE) related reporting indication, wherein the measurement report message comprises any available TSN QoE related information comprising at least one of: a 5G System synchronization accuracy report, a 5G System downlink delay report, a clock drift report, a burst spread report, a preconfigured uplink resource (PUR) or inactive data transmission (IDT) resource suitability report, or a survival time monitoring report,
   wherein the first network element is a 5G Core (5GC) network element, wherein the second network element is a user equipment (UE) or a gNB,
   wherein the measurement request message is a Non-Access-Stratum (NAS) Protocol Data Unit (PDU) or a NAS message and comprises a 5G System synchronization accuracy reporting indication, and
   wherein the measurement report message is a NAS PDU or a NAS message and comprises a 5G System synchronization accuracy report, a first timestamp corresponding to a downlink transmission by the first network element, and a second timestamp corresponding to a reception of the downlink transmission by the second network element.

6. The method of claim 5, wherein the measurement request message comprises a 5G System downlink delay reporting indication and the measurement report message comprises a 5G System downlink delay report,
   wherein the measurement request message is a Time Sensitive Networking (TSN) packet and further comprises a first timestamp corresponding to a transmission of the measurement request message, and wherein the measurement report message further comprises a delay that is a difference of the first timestamp corresponding to the transmission of the measurement request message by the first network element and a second timestamp corresponding to a reception of the measurement request message by the second network element.

7. The method of claim 5, wherein the measurement request message comprises a clock drift reporting indication and the measurement report message comprises the clock drift report, wherein:
   (1) the first network element is configured to transmit two or more reference time information messages comprising a propagation delay compensation (PDC) parameter, wherein the second network element is configured to determine a clock drift based on a local clock and adjacent reference time information messages of the two or more reference time information messages; or
   (2) the first network element is configured to transmit a reference time information message, wherein the second network element is configured to determine a clock drift based on a predefined time duration and the reference time information message, and wherein the clock drift report comprises the clock drift.

8. The method of claim 5, wherein the measurement request message comprises a burst spread reporting indication and the measurement report message comprises the burst spread report,
   wherein the burst spread report comprises one or more of a burst spread record list per packet, a burst spread range, a maximum burst spread value before a burst arrival value, a minimum burst spread value before the burst arrival value, a maximum burst spread value after the burst arrival value, and a minimum burst spread value after the burst arrival value.

9. A wireless communication apparatus comprising a processor and a memory storing instructions, execution of which by the processor causes the apparatus to perform operations comprising:
   transmitting, by a first network element to a second network element, a measurement request message; and
   receiving, subsequent to the transmitting, a measurement report message,
   wherein the measurement request message comprises a Time Sensitive Networking (TSN) Quality-of-Experience (QoE) related reporting indication, wherein the measurement report message comprises any available TSN QoE related information comprising at least one of: a 5G System synchronization accuracy report, a 5G System downlink delay report, a clock drift report, a burst spread report, a preconfigured uplink resource (PUR) or inactive data transmission (IDT) resource suitability report, or a survival time monitoring report,
   wherein the first network element is a 5G Core (5GC) network element, wherein the second network element is a user equipment (UE) or a gNB,
   wherein the measurement request message is a Non-Access-Stratum (NAS) Protocol Data Unit (PDU) or a NAS message and comprises a 5G System synchronization accuracy reporting indication, and
   wherein the measurement report message is a NAS PDU or a NAS message and comprises a 5G System synchronization accuracy report, a first timestamp corresponding to a downlink transmission by the first network element, and a second timestamp corresponding to a reception of the downlink transmission by the second network element.

10. The apparatus of claim 9, wherein the measurement request message comprises a clock drift reporting indication and the measurement report message comprises the clock drift report, wherein:
    (1) the first network element is configured to transmit two or more reference time information messages comprising a propagation delay compensation (PDC) parameter, wherein the second network element is configured to determine a clock drift based on a local clock and adjacent reference time information messages of the two or more reference time information messages; or
    (2) the first network element is configured to transmit a reference time information message, wherein the second network element is configured to determine a clock drift based on a predefined time duration and the reference time information message, and wherein the clock drift report comprises the clock drift.

11. The apparatus of claim 9, wherein the measurement request message comprises a burst spread reporting indication and the measurement report message comprises the burst spread report,
    wherein the burst spread report comprises one or more of a burst spread record list per packet, a burst spread range, a maximum burst spread value before a burst arrival value, a minimum burst spread value before the burst arrival value, a maximum burst spread value after the burst arrival value, and a minimum burst spread value after the burst arrival value.

12. A wireless communication apparatus comprising a processor and a memory storing instructions, execution of which by the processor causes the apparatus to perform operations comprising:
    receiving, by a second network element from a first network element, a measurement request message;
    performing, based on the measurement request message, one or more measurements to generate a measurement report message; and
    transmitting, to the first network element, the measurement report message,
    wherein the measurement request message comprises a Time Sensitive Networking (TSN) Quality-of-Experience (QoE) related reporting indication, wherein the measurement report message comprises any available TSN QoE related information comprising at least one of: a 5G System synchronization accuracy report, a 5G System downlink delay report, a clock drift report, a burst spread report, a preconfigured uplink resource (PUR) or inactive data transmission (IDT) resource suitability report, or a survival time monitoring report,
    wherein the first network element is a 5G Core (5GC) network element, wherein the second network element is a user equipment (UE) or a gNB,
    wherein the measurement request message is a Non-Access-Stratum (NAS) Protocol Data Unit (PDU) or a NAS message and comprises a 5G System synchronization accuracy reporting indication, and
    wherein the measurement report message is a NAS PDU or a NAS message and comprises a 5G System synchronization accuracy report, a first timestamp corresponding to a downlink transmission by the first network element, and a second timestamp corresponding to a reception of the downlink transmission by the second network element.

13. The apparatus of claim 12, wherein the measurement request message comprises a clock drift reporting indication and the measurement report message comprises the clock drift report, wherein:

(1) the first network element is configured to transmit two or more reference time information messages comprising a propagation delay compensation (PDC) parameter, wherein the second network element is configured to determine a clock drift based on a local clock and adjacent reference time information messages of the two or more reference time information messages; or (2) the first network element is configured to transmit a reference time information message, wherein the second network element is configured to determine a clock drift based on a predefined time duration and the reference time information message, and wherein the clock drift report comprises the clock drift.

14. The apparatus of claim 12, wherein the measurement request message comprises a burst spread reporting indication and the measurement report message comprises the burst spread report, wherein the burst spread report comprises one or more of a burst spread record list per packet, a burst spread range, a maximum burst spread value before a burst arrival value, a minimum burst spread value before the burst arrival value, a maximum burst spread value after the burst arrival value, and a minimum burst spread value after the burst arrival value.

* * * * *